United States Patent [19]
Webster, Jr. et al.

[11] Patent Number: 6,086,722
[45] Date of Patent: Jul. 11, 2000

[54] MINIMIZING EVAPORATOR SCALING AND RECOVERY OF SALTS DURING GASIFICATION

[75] Inventors: George Henry Webster, Jr., Willis; Byron Von Klock, Beaumont; Dinh-Cuong Vuong, Sugar Land, all of Tex.; John Saunders Stevenson, Yorba Linda, Calif.; Steven Robert Johnson, Boulder City, Nev.

[73] Assignee: Texaco Inc., White Plains, N.Y.

[21] Appl. No.: 08/890,356

[22] Filed: Jul. 9, 1997

Related U.S. Application Data

[60] Provisional application No. 60/016,882, Jul. 17, 1996, and provisional application No. 60/021,892, Jul. 17, 1996.

[51] Int. Cl.[7] .............. B01D 3/42; C02F 1/04; C10J 3/72

[52] U.S. Cl. .............. 203/12; 48/197; 48/202; 48/204; 48/210; 159/44; 159/45; 159/DIG. 13; 203/1; 203/10; 203/48

[58] Field of Search .............. 203/7, 1, 12, 10, 203/48, 89, 90, DIG. 17; 159/DIG. 13, 47.1, 3, 47.3, 45, 49, 94; 423/358, 240, 481; 210/638; 48/197, 202, 204, 210; 23/298

[56] References Cited

U.S. PATENT DOCUMENTS

| | | | |
|---|---|---|---|
| 3,401,094 | 9/1968 | Lindsay, Jr. | 203/48 |
| 3,790,448 | 2/1974 | Didycz et al. | 203/48 |
| 4,188,195 | 2/1980 | Jablin | 55/89 |
| 4,211,646 | 7/1980 | Westbrook et al. | 210/15 |
| 4,323,430 | 4/1982 | Glassman et al. | 203/7 |
| 4,468,376 | 8/1984 | Suggitt | 423/358 |
| 4,702,798 | 10/1987 | Bonanno | 159/47.1 |
| 4,936,872 | 6/1990 | Brandl | 48/197 R |
| 5,783,084 | 7/1998 | Suenkonis | 210/638 |

*Primary Examiner*—Virginia Manoharan
*Attorney, Agent, or Firm*—Henry H. Gibson; Rodman & Rodman

[57] ABSTRACT

A process for minimizing evaporator scaling during the recovery of liquids and solids from the aqueous effluent discharged during a partial oxidation gasification, wherein the aqueous effluent contains ammonium chloride ($NH_4Cl$). The aqueous effluent is evaporated to produce a distillate water and a brine having an $NH_4Cl$ concentration of about 10 to 60 weight percent. The brine can be further concentrated and ammonium chloride crystals are recovered. The distillate water is recycled to the gasification reaction. No effluent discharges to the environment.

22 Claims, 4 Drawing Sheets

MINIMIZING EVAPORATOR SCALING AND RECOVERY OF SALTS DURING GASIFICATION

This application claims the benefit of U.S. Provisional Application No. 60/016,882, filed Jul. 17, 1996, and U.S. Provisional Application No. 60/021,892, filed Jul. 17, 1996.

BACKGROUND OF THE INVENTION

1. Field of the Invention

This invention relates to a process for the gasification of organic materials. More particularly, the invention relates to a process for minimizing scaling and the treatment and recovery of dissolved minerals from the aqueous effluent in a gasification process with minimal discharge of waste products.

2. Description of the Prior Art

High pressure, high temperature gasification systems have been used to partially oxidize hydrocarbonaceous fuels such as coal or organic waste materials including plastic wastes, petroleum coke or sewage to recover useful by-products or energy. The fuels can be admixed with water to form an aqueous feedstock that is fed to the reaction zone of a partial oxidation gasifier. Water is used to quench the hot gaseous products, referred to as "synthesis gas" or "syngas." Water is also used to scrub particulate matter from the syngas and to cool and/or convey particulate waste solids, such as ash and/or slag out of the gasifier.

Davy, "Latest Advances in Zero Liquid Discharge Treatment for Coal Gasification Plants," (Power-Gen Americas Int'l. Conf., Orlando, Fla., December 1994) discloses wastewater treatment options and salt recovery, including the use of falling film evaporator and forced circulation crystallizers.

Coste, "Effluent System in View of Both Zero Discharge and Hazardous Solid Waste Minimization" (undated) discloses a waste water treatment process, including a multiple effect evaporation and crystallization treatment to remove soluble salts.

DeJong, "Coal Gasification and Water Treatment" (pages 90–93) (Synthese Vamn Verworvenheden, undated) discloses wastewater treatment including crystallization of dissolved salts.

SUMMARY OF THE INVENTION

The invention relates to a process for minimizing evaporator scaling during the recovery of liquids and solids from the aqueous effluent discharged during a partial oxidation gasification, wherein the aqueous effluent contains ammonium chloride ($NH_4Cl$). The aqueous effluent is evaporated to produce a distillate water and a brine having an $NH_4Cl$ concentration of about 10 to 60 weight percent. The brine can be further concentrated and ammonium chloride crystals can be recovered. The distillate water is recycled to the gasification reaction. No effluent discharges to the environment.

DESCRIPTION OF THE PREFERRED EMBODIMENTS

In accordance with the present invention, it has been found that the distillation of an aqueous effluent containing ammonium chloride by using evaporators is an effective and economical means for recovering relatively pure water and ammonium chloride salt crystals, while minimizing scale formation on the evaporator heat transfer surfaces. The water produced can be recycled to the partial oxidation gasification system and the crystallized ammonium chloride can be landfilled or marketed commercially.

In order to conserve water, gasification units recirculate the process water, generally after removal of the fine particulate matter in a solids settler. Since the gasification reaction consumes water by producing hydrogen in the syngas, it is generally not necessary to remove water from the system to prevent accumulation. Nevertheless, a portion of the water is normally continuously removed as an aqueous effluent, grey water, purge wastewater or "blowdown" stream to prevent excessive buildup of corrosive salts, particularly chloride salts.

Chloride salts are of particular concern since they are water-soluble and can accumulate in the recirculated process water. Moreover, chloride is corrosive to materials such as stainless steels, which are used in the gasification process waste system equipment. In the partial oxidation gasification reaction, where coal, waste plastics and other chloro-organic materials are used as the feedstock, the most common chloride exiting the gasification zone is hydrogen chloride. In general, the concentration of ammonium chloride in the aqueous effluent is at least about 0.1 weight % to about 15 weight %.

The partial oxidation reaction also produces ammonia from feedstock organo-nitrogen compounds that are commonly found in coals and heavy oils, with molar nitrogen conversions to ammonia ranging from about 15% to about 25%. The ammonia and hydrogen chloride react in the water system to form an ammonium chloride solution. For feedstocks such as plastic oils, the nitrogen to chlorine ratio in the synthesis gas may be insufficient to produce an adequate amount of ammonia to neutralize the hydrogen chloride. Therefore, ammonia can be added to the gasification water system to make up for the deficiency.

The composition of the blowdown wastewater or grey water discharged from the gasification system is fairly complex. For a feedstock with relatively high levels of chloride, the principal wastewater component will be ammonium chloride. A portion of the carbon monoxide in the syngas reacts with water under high-temperature, high-pressure conditions in the scrubber to make formic acid: $CO+H_2O \rightarrow HCOOH$.

The formic acid is also neutralized by ammonia, to make ammonium formate as another wastewater constituent. The acidic gases carbon dioxide and hydrogen sulfide are also components of the syngas, but are not very water soluble. Most of the remaining ammonia in the gasification wastewater which is not neutralized by chloride or formate reacts as the ammonium ion with the anionic forms of the acid gases carbon dioxide and hydrogen sulfide to form bicarbonate or carbonate depending on the pH, and bisulfide.

Since the effluent wastewater contains ammonium salts and other potentially environmentally harmful dissolved materials such as sulfide and cyanide, the effluent wastewater from the gasification system cannot be discharged to the environment without treatment. Since treatment for a multitude of wastewater contaminants can be elaborate and expensive, other simpler and less expensive means for handling the wastewater are desirable.

The partial oxidation reaction is preferably carried out in a free-flow, unpacked non-catalytic gas generator, or gasifier at a temperature within the range of about 700° C. to about 2000° C., preferably about 1200° C. to about 1500° C., and at a pressure of about 2 to about 250 atmospheres, preferably about 10 to about 150 atmospheres, and most preferably about 20 to about 80 atmospheres. Under these conditions, about 98% to 99.9% of the hydrocarbonaceous feedstock can be converted to a synthesis gas containing carbon monoxide and hydrogen, also referred to as synthesis gas or syngas. Carbon dioxide and water are also formed in small amounts. The hydrocarbonaceous feedstock can be petroleum coke, coal, waste plastic material, sewage, or a suitable combination.

With high ash content feeds, on the order of about five to about fifteen weight percent, most of the inorganic material in the feed is converted into a vitreous slag. Chlorine in the feed is converted to hydrogen chloride gas which is absorbed into the process water in the quench chamber of the gasifier, and neutralized by ammonia present in the process water system to produce ammonium chloride. An aqueous effluent, or grey water blowdown stream containing ammonium chloride is discharged from the gasification system, and can be treated by addition of $FeCl_2$ to produce an iron hydroxide floc to remove any sulfide, cyanide and particulate matter, followed by ammonia stripping, biological treatment, or evaporation to produce a dry salt for commercial marketing and a distillate water. The water can then be recycled to the process thereby eliminating any wastewater discharge from the plant.

A quench gasifier is generally used for the gasification of waste hydrocarbonaceous feedstocks. In this type of gasifier, the hot syngas and molten slag are quenched with water.

For most chloride-containing gasification feedstocks, the chloride is converted to hydrogen chloride in the syngas exiting the gasifier. The quench water removes finely divided particulate matter and HCl from the gas. Gas cleanup technologies such as regenerative acid gas scrubbing, can be used to purify the syngas for commercial use.

Since hydrogen chloride vapors become very corrosive hydrochloric acid when contacting gasifier system process water, it is expedient to neutralize the hydrochloric acid to protect the system metallurgy. Many alkalis such as the hydroxides or carbonates of sodium, potassium, calcium, or magnesium can be used as neutralizing agents. However, ammonia is the preferred neutralizing agent because in many feedstocks such as residual oils and coals, ammonia is produced as a byproduct. In many cases sufficient ammonia is produced from the feedstock so that there is no need for additional ammonia or a supplemental neutralizing agent.

Furthermore, unlike other chlorides, ammonium chloride is highly water soluble, and its solubility varies significantly with temperature. These are important properties for salt recovery from the gasification system water effluent, which can be evaporated with falling film evaporators, or with forced circulation evaporators, or both in combination.

It has been found that the recovery of ammonium chloride crystals from an aqueous effluent or grey water is best accomplished when the aqueous effluent has been evaporated to a concentration of about 10% to about 60%, and preferably about 25% to about 45% ammonium chloride. The concentrated brine which contains suspended and dissolved solids from the evaporator can then be crystallized to recover the $NH_4Cl$ salts and the distillate water stream can be returned to the gasification quench water system.

In a falling film evaporator, the main system heat exchanger is disposed vertically. Brine is pumped from a sump located below the heat exchanger tubes to the top of the heat exchanger tubes. The brine then flows down or falls through the tubes as a film on the interior tube walls, receiving heat from steam on the shell side, and evaporates as it falls down and is withdrawn from the bottom.

The mixture of evaporated or concentrated brine and steam exits the bottom of the heat transfer tubes and enters the brine sump, where the steam or water vapor and liquid brine separate. The steam vapors exit the top of the brine sump, and the liquid brine remains in the sump. Feed water which can be the aqueous effluent or blowdown wastewater is continuously added to the brine sump, and a portion of the concentrated brine is continuously withdrawn from the brine sump to maintain a desired concentration factor.

In a forced circulation evaporator, the main system heat exchanger is horizontal. Brine is pumped through the tubes and steam enters the shell side of the exchanger to heat the brine. Boiling does not occur inside the tubes since the brine is under sufficient pressure to prevent boiling. The hot brine exits the exchanger tubes under pressure and passes through an orifice plate and then passes to a brine sump located above the evaporator.

As the brine passes through the orifice plate, its pressure falls. When the brine pressure decreases, the hot brine boils and forms a two-phase mixture of concentrated brine and water vapors.

As the brine-water vapor mixture enters the brine sump, the water vapors separate from the brine, exit the sump and enter a condenser to form a distillate water stream. The concentrated brine is then recirculated and a portion is removed or withdrawn to salt recovery. Also, as in a falling film evaporator, feed water which can be grey water from the gasification system is routed to a recirculating brine loop to maintain the desired concentration factor.

The temperature of the hot brine varies from about 225° F. to about 245° F., preferably from about 235° F. to about 240° F. at atmospheric pressure.

The concentration factor is the main performance criterion for an evaporator, since it determines the extent to which the unit performs its function, for example flow reduction. The concentration factor is also important in controlling and minimizing heat exchanger scaling, since the higher the concentration factor, the more minerals come out of solution, and potentially deposit on the heat exchanger surface as scale.

The concentration factor in evaporators is generally defined as the mass flow of the feed entering divided by the mass flow of brine blowdown exiting, where there is no recycle of brine to the evaporator. In a system where there is a non-evaporating and non-precipitating component, the concentration factor can be defined as the concentration of a non-evaporating, non-precipitating component in the brine divided by the concentration of a non-evaporating, non-precipitating component in the feed. A suitable example of such a component is sodium or potassium. In an evaporator with a recycle stream, or an evaporator with a crystallizer, the latter definition is usually more appropriate. In the inventive system sodium and potassium do not precipitate to any appreciable extent under proper operation, and the latter definition of concentration factor would be applicable.

The aforementioned types of evaporators are known for water distillation applications. However, their usability depends on the rate of scale accumulation on the evaporator heat exchanger surfaces. Materials particularly likely to form scale are the slightly soluble minerals which will precipitate as they concentrate during the evaporation process such as compounds of aluminum, calcium, magnesium, fluorine, iron and silicon, specifically silica ($SiO_2$), calcium fluoride ($CaF_2$), magnesium fluoride ($MgF_2$) and iron cyanide, which are the most significant scaling compounds.

A typical aqueous effluent or grey water discharged from a partial oxidation gasification system will contain about 100 to about 500 milligrams of scaling compounds per kilogram of water. In the evaporation and concentration of grey water from a gasification process to recover $NH_4Cl$, the concentration factor can vary from about 20 to 1,000. It has been found that the falling film evaporator has acceptable scaling rates at concentration factors from about 2 to 20. At higher concentration factors, the forced circulation evaporator is more desirable.

Another important factor in minimizing evaporator scaling is the steam to brine temperature difference, which is the change in temperature across the heat exchanger tubes, for example, steam on the shell side, and the falling brine film on the tube side. At higher steam to brine temperature differences, boiling is more likely to occur directly on the tube surface instead of within the brine film, and thus lead to local evaporation to dryness. This will greatly accelerate the rate of scale deposition on the tubes. Alternatively, since the evaporation rate is directly proportional both to the steam to brine temperature difference and the surface area of the tubes, the amount of tube area provided, and thus the equipment cost, can be reduced if the steam to brine temperature difference can be increased. A suitable range for steam to brine temperature difference in the falling film evaporator with acceptable scaling rates with minimum tube area was found to be from about 1° F. to about 20° F., and preferably from about 6° F. to about 10° F.

As with falling film evaporators, high steam to brine temperature difference in a forced circulation evaporator can lead to local boiling on the tube surfaces, and thus scale deposition. Since boiling is normally suppressed in a forced circulation evaporator by maintaining pressure on the brine, this temperature range can be increased. It has been found that an acceptable range of steam to brine temperature difference is from about 1° F. to about 36° F., and preferably from about 12° F. to about 24° F.

Evaporation per pass in a falling film evaporator is another important factor in controlling scaling, and is the amount of evaporation experienced by brine, for example, expressed in percent as the brine falls through the tubes. At a high evaporation per pass, the brine exiting the bottom of the tubes is highly concentrated in relation to the brine entering the top of the tubes. Therefore, more scaling minerals can precipitate from the brine solution. Alternatively, high evaporation per pass allows operating with lower brine recirculation rates. This is economically attractive because it lowers pumping costs. In accordance with this invention, the acceptable evaporation per pass was found to be from about 0.12% to about 2.4%, and preferably from about 0.6% to about 1.2% for minimum operating cost with acceptable scaling.

As the brine passes through the tubes and evaporates, it can become supersaturated with certain minerals which do not immediately precipitate. A particularly troublesome scale mineral is silica, which precipitates by polymerization. This is a slower process than ion combination which generally controls precipitation of the other minerals. If supersaturation is occurring, it is preferable to lengthen the residence time of the brine in the sump, so that the supersaturated minerals can precipitate harmlessly before being recirculated to the heat exchange tubes. Alternatively, a long sump residence time requires a larger vessel, which can significantly increase the equipment costs. In the present invention, sump residence times for both falling film and forced circulation evaporators of from about 0.25 minutes to about 4 minutes are employed, with a preferred residence time of about 1 to about 2 minutes.

In a falling film evaporator, the brine temperature changes very little as it passes through the tubes, since it boils as it falls, and its temperature does not exceed the boiling point. This is not the case with forced circulation evaporators, wherein tube boiling is suppressed by pressure, and the brine temperature rises as it passes through the heat exchanger. The more the temperature is allowed to rise, the more economical the operation, since less brine must be recirculated to achieve a given amount of heat transfer. This reduces pumping costs which are a major economical factor. Alternatively, some mineral salts, particularly calcium sulfate and calcium carbonate, are less soluble at higher temperatures. In the present invention, the acceptable range for brine temperature rise was found to be from about 1° F. to about 24° F., and preferably from about 6° F. to about 18° F.

Brine velocity in the heat exchanger tubes is another important design parameter in forced circulation evaporation to minimize scaling. Higher velocities prevent scale adherence and also improve heat transfer. However, higher velocities entail higher pumping costs. In the present invention, an acceptable velocity was found to be from about 9 to about 14 feet/second with about 10 feet/second being preferred.

Two methods are commonly used for controlling the concentration factor. The first method involves on-line measurement of the concentration of the non-evaporating, non-precipitating chemical component, that is, sodium or potassium, such that the brine blowdown flow can be controlled to maintain a fixed ratio between the feed water to the brine concentration of the sodium or potassium, and the brine concentration.

Because of its ease of use, electrical conductivity is often used for this purpose. For evaporating gasification water, conductivity cannot be used since one of the main conductive species, ammonia, is not all retained in the brine. Moreover, even if ammonia did not distill, electrical conductivity meters have been found to scale in grey water.

The other method for controlling concentration factor is to measure the feed rate of gasification water entering and to use that rate to control a blowdown flow controller, with the flow ratios set at the concentration factor. However, brine has a high tendency to form scale on all wetted surfaces in the evaporator system. This causes fouling on various flow metering devices, such as magnetic flowmeters and paddlewheel flowmeters, to the extent that the devices become unworkable. Similar problems can be expected with other flow measurement devices such as orifice plates or venturi meters whose geometry would be changed by scale deposition and mechanical devices such as turbine flowmeters whose mechanical parts can be clogged with scale.

The method for controlling concentration factors employed in the present invention avoids the need for flow measurement by substituting on-line volume measurement using level detectors, which are much more reliable than flow detectors. The basic principles of the control system are the evaporation rate which is set by the steam flow control or the corresponding compressor power in a vapor recompression unit.

The distillate from an evaporator is collected in batches in a distillate measuring tank. Completion of a batch collection is signaled by the level detector on the tank. A batch of brine is collected and discharged for each distillate batch, for example 500 gallons of distillate, 50 gallons of brine. The concentration factor is set by the ratio of the distillate batch weight and the brine batch weight.

When a distillate batch has been collected, a brine batch is collected, again with volume controlled by a level detector on the brine measuring tank. Feed water is added to the system to maintain a predetermined level in the brine sump.

This system enables control of the brine discharge rate, and exact control of the concentration factor, and utilizes only level detectors, which are much less susceptible to failure by scale deposition than are flow detectors because contact time is minimal. Particularly suitable level detectors, for example, are magnetic reed float switches constructed of Ryton R-4™, (Phillips 66 Company), and manufactured by Imo Industries Inc. Gems Sensor Division of Plainville, Conn. Some level detectors are very reliable which have no contact with the liquid, even in the presence of scale on the inside of the vessel, such as an ultrasonic level detector.

The control circuitry can be constructed of commonly available relays. It can also be constructed with electronic devices of various types such as programmable logic controllers or integrated circuits.

In one embodiment, a slipstream of evaporator brine is routed to a flash cooling crystallizer, in which the brine is cooled by reduced pressure, whereby ammonium chloride crystals are formed due to its reduced solubility at reduced temperature on the order of from about 46% at 244° F. to about 35% at 135° F. by weight of $NH_4Cl$. Ammonium chloride crystals can be produced as a salable product. The vapors evolved are condensed to produce a distillate water stream which can be combined with the evaporator distillate and recycled to the gasifier. As a result of the evaporation at reduced pressure, the temperature of the brine falls to its corresponding boiling point temperature at that pressure and a recycle brine stream and a purge brine stream are produced.

The ammonium chloride crystals can be separated from the cooled brine by means such as settling, centrifugation, and filtration. The separated crystals can be recovered as is, or can be washed with a portion of cool distillate water at a minimum contact time to enhance their purity.

The cooled recycle brine stream, saturated with ammonium chloride at the crystallizer temperature, can be recycled to the evaporator system to further concentrate the brine to the point where it can be returned to the crystallizer to recover additional ammonium chloride crystals.

The brine filtrate in a purge stream can be impure. The process of the present invention provides a system wherein no waste salt stream is produced. This is accomplished by recycling the purge brine stream to the gasifier burner for the gasification reaction. Since the soluble salts, namely chlorine, sent to the gasifier eventually wind up in the water fed to the waste water evaporation, and then in the crystallizer brine, this technique to be successful must provide a means for salt components other than ammonium chloride to leave the system Next to ammonium chloride, the salt with the highest concentration is ammonium formate, which comprises up to 20% of the total dissolved solids. In this invention, the means by which formate escapes being trapped in a "salt loop" is thermal decomposition of the formate in the evaporator distillate and purge stream to carbon monoxide and water at temperatures of about 2000° F. to about 2500° F.: $HCOOH \rightarrow CO+H_2O$. It has been discovered that operation of the evaporators at temperatures greater than about 230° F. results in a significant amount of formate recycle to the distillate.

It has been discovered that recycling formate containing processed water back to the gasifier burner eliminates buildup of formate. Besides ammonium chloride and formate, there is also a small amount, on the order of about 8%, of other salts, including those containing ions of sodium, potassium, aluminum, calcium, magnesium, boron, fluorine, and silicon. The salts can be recycled back to the gasifier via a purge stream. These components avoid buildup in the water system because they are removed in the gasifier slag. The basis for this performance is partitioning of these minerals.

The partitioning depends on the water temperature, water pH and contact time between the slag phase and the water phase. Most of the material is included in the slag stream rather than the blowdown water stream. For example, over 99% of the potassium, aluminum, calcium, magnesium, and silicon is partitioned into the slag. For the remaining components, the partitioning into slag is about 97% for sodium, 85% for fluoride, and 58% for boron.

In order to achieve zero or minimal discharge of water, it is necessary to remove water from the concentrated brine exiting the evaporator. One technique for drying brine is on the surface of a heated drum. In heated drum drying, two hollow drums are placed in near contact with their axes horizontal. The drums are made to rotate around their axes by mechanical means, with the two drums rotating in opposite directions, for example, one clockwise, one counterclockwise. Steam is placed in the hollow center of the drums, and condensate water is removed. Brine to be dried is placed into the top center section of the drum pair, an area known as the "nip". As the hot drums rotate, heat is transferred to the brine, with eventual evaporation of all the water, leaving a solid salt cake on the drum surface. Each drum surface rotates past a doctor blade, which scrapes the salt into a receiving bin.

There are two modes of operation for a two drum system. In the first mode, known as "double drum" operation, the rotation direction of the drums is such that the drum surfaces are moving downwards in the nip area. In the second mode, known as "twin drum" operation, the rotation direction of the drums is such that the drum surfaces are moving upwards in the nip area. Both modes of operation are found to be successful for drying gasification wastewater brine.

Figure 1:
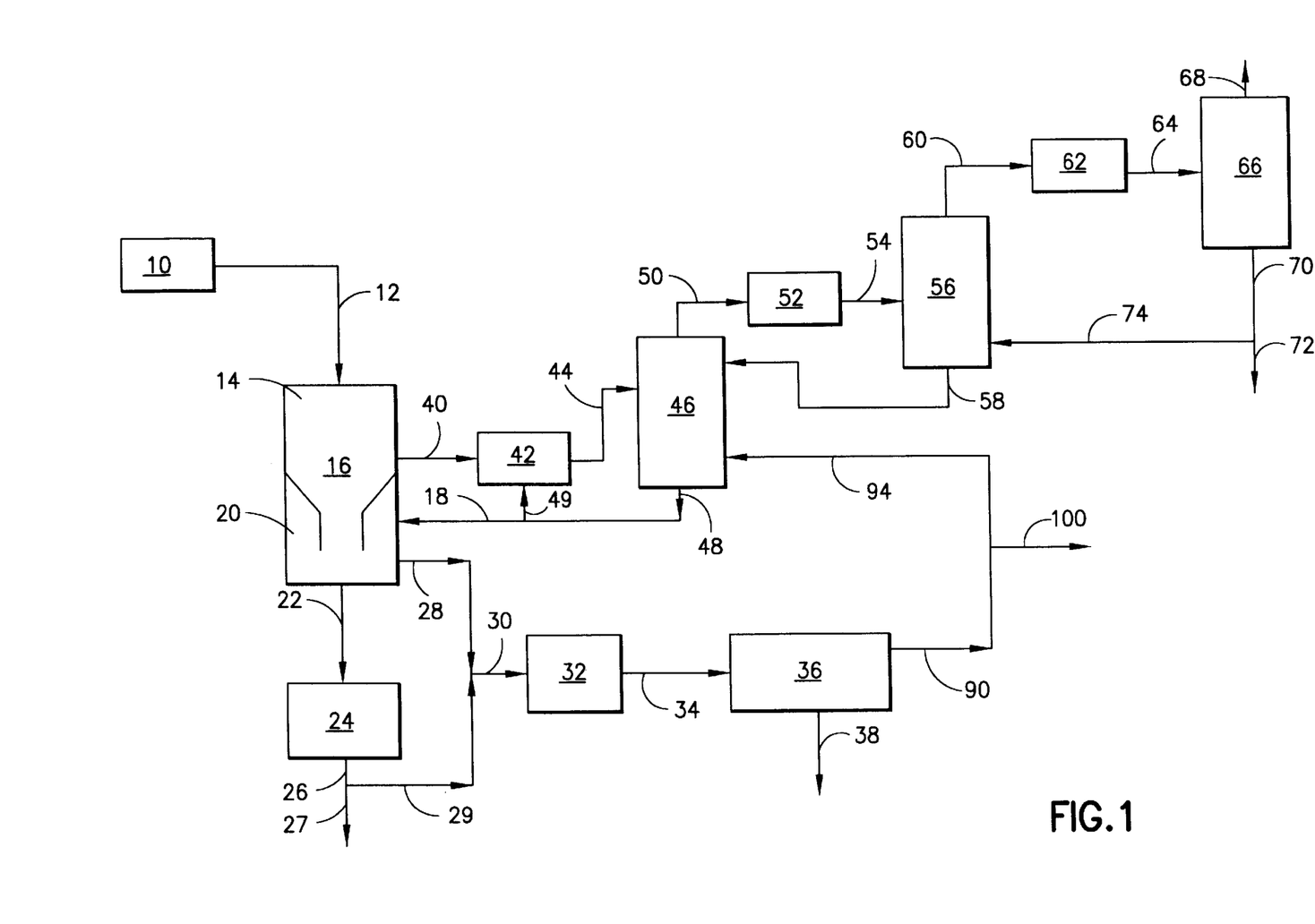
FIG. 1 is a simplified schematic representation of a process for producing syngas by the partial oxidation of a coal slurry.

Referring now to FIG. 1 coal and water are mixed together to form a slurry in tank 10 which is fed to the reaction zone 14 of the high-temperature gasifier 16 through line 12 to which an oxidizing agent such as oxygen is added. Partial oxidation of the coal occurs in reaction zone 14 to form a raw syngas and a slag by-product which passes to the quench chamber 20 at the lower end of the gasifier 16, where the hot syngas and molten slag are contacted with quench water stream 18, and are cooled and separated. The slag is transported in quench water or grey water and is conveyed through line 22 to lockhopper 24 which removes the slag with some grey water from the system through line 26. The slag which is non-toxic, exits in line 27 for use as a building material or landfill. Grey water stream 28 from quench chamber 20 and grey water stream 29 which is separated from line 26 are combined in line 30 and fed to the vacuum flash drum 32. Therein the grey water is cooled and exits through line 34 to the solids settler 36 where ash fines are separated from the grey water and removed from the system in line 38.

Syngas exits quench chamber 20 through line 40 to the venturi scrubber 42 and then through line 44 to the carbon scrubber 46 where fine ash and soot are removed from the syngas and exit in a water stream through line 48. Water stream 48 is divided into line 49 which enters the venturi scrubber 42 to serve as the aqueous scrubbing medium. Water stream 48 is also divided into line 18 which serves as quench water introduced to the quench chamber 20.

Particulate-free syngas with entrained water exits the top of carbon scrubber 46 through line 50 to condenser 52, where some water is condensed, and then passes through line 54 to a water knockout tank 56 which separates the water from the syngas. The underflow water stream 58 exits tank 56 and enters the top of carbon scrubber 46. The syngas stream 60 exits the top of water knockout tank 56, and enters condenser 62 which condenses ammonia and the balance of the water, which exits through line 64 to syngas separator 66 and exits the system as clean syngas stream 68. Water stream 70 exits the syngas separator 66, and is separated into blowdown stream 72 and stream 74, which is recycled to the water knockout tank 56.

If the nitrogen to chlorine ratio is too low to neutralize all the chloride content, ammonia can be added to the water system at the venturi scrubber 42 and/or the carbon scrubber 46. The criteria for making this ratio determination is the pH of the water in the scrubbers. It is desirable to maintain the pH at least about 6 or above, and preferably from 6 to 9. This assures ammonium chloride recovery. Another indication that additional ammonia is needed is the absence of ammonia in the underflow stream 58 from the water knockout tank 56 and/or stream 70 exiting the syngas separator 66.

Supernatant grey water stream 90 exits the solids settler 36 and is separated into stream 94 which enters the bottom of carbon scrubber 46 and is supplied with additional make-up water, if needed. Stream 90 is also separated into blowdown grey water stream 100 containing ammonium chloride, which exits the system for further treatment to remove soluble salts.

Figure 2:
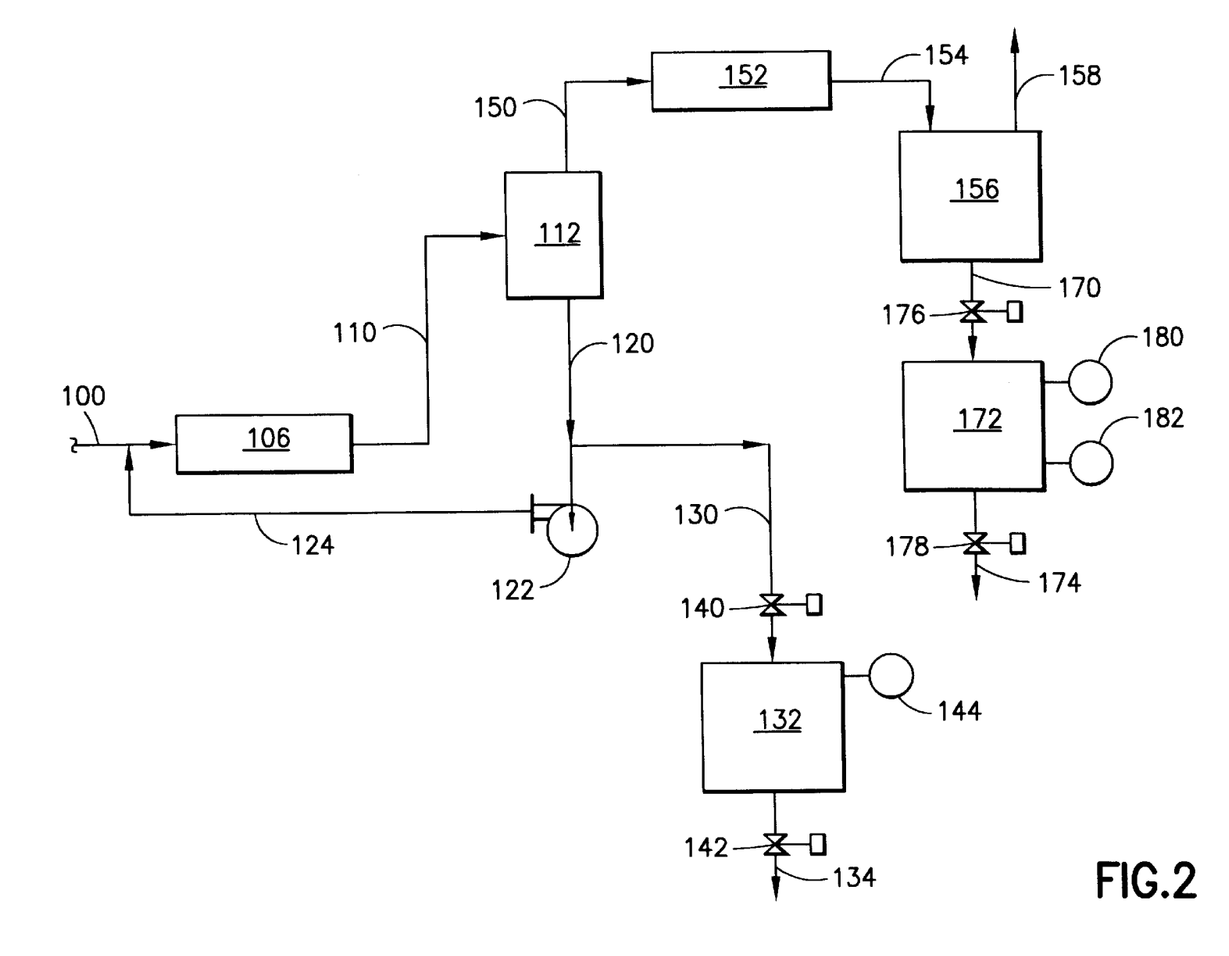
FIG. 2 is a simplified schematic representation of an evaporator system for treating aqueous effluent produced by the process of FIG. 1.

Referring now to FIG. 2, the blowdown grey water stream 100 containing ammonium chloride from the system shown on FIG. 1, or from storage, enters the treatment system and is fed to the forced circulation steam-heated evaporator 106 and discharges through line 110 to elevated brine sump 112. The reduced pressure of the heated grey water 110 entering the brine sump 112 causes flashing of some of the water. Brine stream 120 exits the bottom of brine sump 112 and is divided into stream 124 which is recirculated by pump 122 to the inlet of evaporator 106. A portion of the recirculating brine stream 120 is removed through line 130 to the brine measuring tank 132 and exits the system as ammonium chloride product brine through line 134. Measurement and discharge of product brine is effected through control valves 140 and 142 and high level indicator 144.

Thus, control valve 142 is closed, while control valve 140 is opened. Brine fills brine measuring tank 132 until high level indicator 144 is activated. At that point, control valve 140 is closed, while control valve 142 is opened and brine measuring tank 132 is drained. The procedure is repeated throughout operation of the treatment system. Operating in this manner minimizes scale formation. The brine sump 112 serves as an accumulator for the measurement and discharge of product brine. The product brine stream 134 can then be further processed by crystallization and/or drying techniques to produce a solid ammonium chloride product.

Water vapor stream 150 exits the top of brine sump 112, passes through the condenser 152, and enters the knockout drum 156 through line 154. Uncondensed gas exits the top of knockout drum 156 through vent line 158 for further treatment (not shown). Condensate water exits the bottom of knockout drum 156 through line 170 and passes to the distillate measuring tank 172, where it exits the system as relatively pure distillate water through line 174. The measurement and discharge of the the distillate water product through line 174 is regulated by control valves 176 and 178, high level indicator 180 and low level indicator 182. Control valve 178 is closed, while control valve 176 is opened. Distillate measuring tank 172 fills with distillate until high level indicator 180 is activated. Then, control valve 176 is closed, while control valve 178 is opened and distillate water product flows through line 174 from distillate measuring tank 172 until low level indicator 182 is activated. At that point, the procedure is repeated.

Knockout drum 156 serves as an accumulator for the measurement and discharge of product distillate. The distillate product can be recycled for use as makeup water in the gasification system of FIG. 1. Other equivalent means of measuring and discharging distillate and brine can be employed in place of the specific means illustrated on FIG. 2.

While the treatment system illustrated on FIG. 2 employs forced circulation, it is to be understood that falling film evaporation or a combination of falling film and forced circulation evaporation techniques can also be employed.

Figure 3:
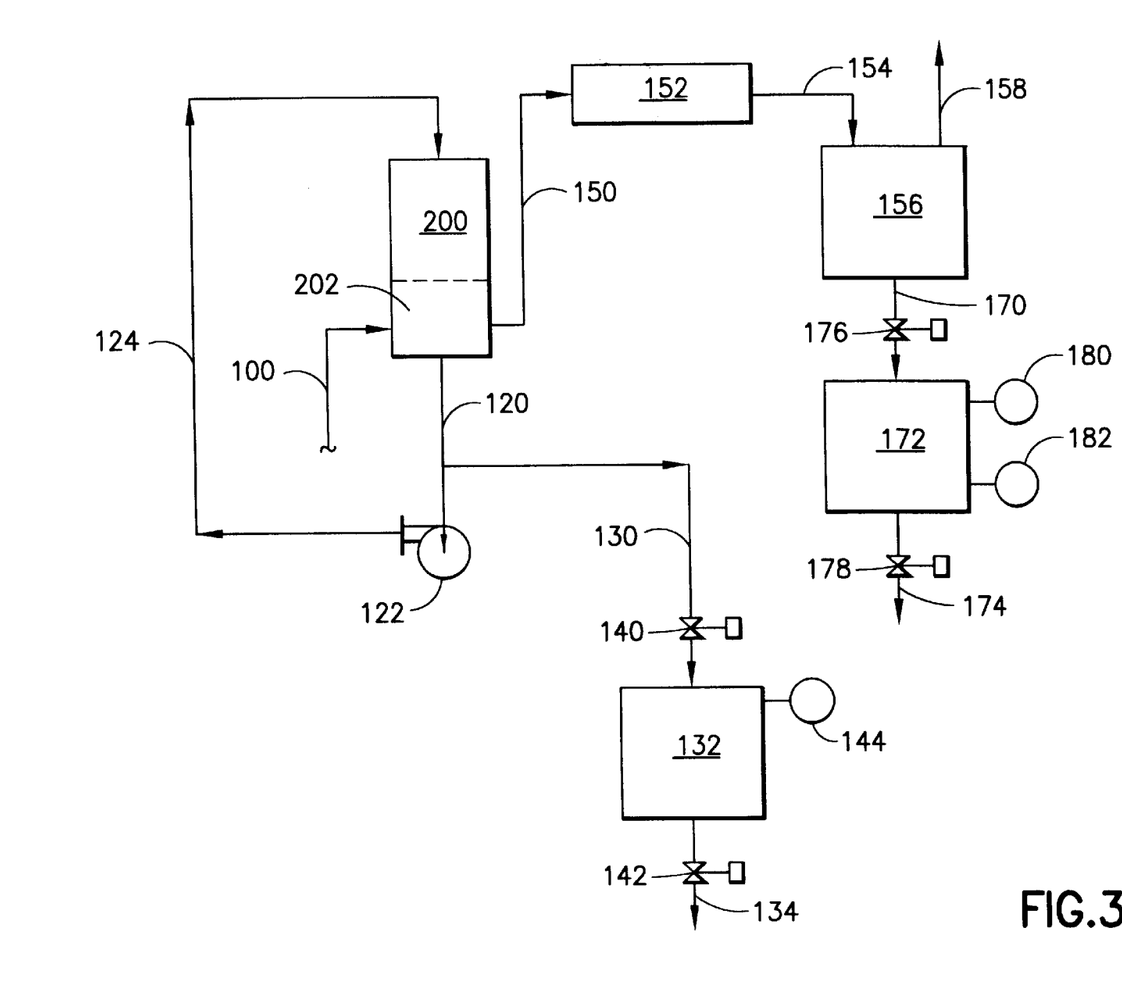
FIG. 3 is a simplified schematic representation of an alternative system for treating aqueous effluent produced by the process of FIG. 1.

FIG. 3 illustrates a grey water blowdown treatment system employing falling film evaporator 200. Operation of the system in FIG. 3 is similar to that of FIG. 2 where a forced circulation evaporator is employed and corresponding elements of the system of FIG. 3 having the same reference numerals as those of the system of FIG. 2 have similar functions. A major difference is that brine sump 202 comprises the lower portion of the falling film evaporator 200. In the operation of the falling film evaporator 200, the pump 122 recirculates brine from sump 202 to the top of falling film evaporator 200 wherein the brine and water vapor fall through the tubes in the evaporator downwardly into sump 202 where the brine and water vapor are separated. The water vapor exits the sump through line 150 and is condensed in condenser 152. Feed blowdown grey water in stream 100 is fed to sump 202.

Figure 4:
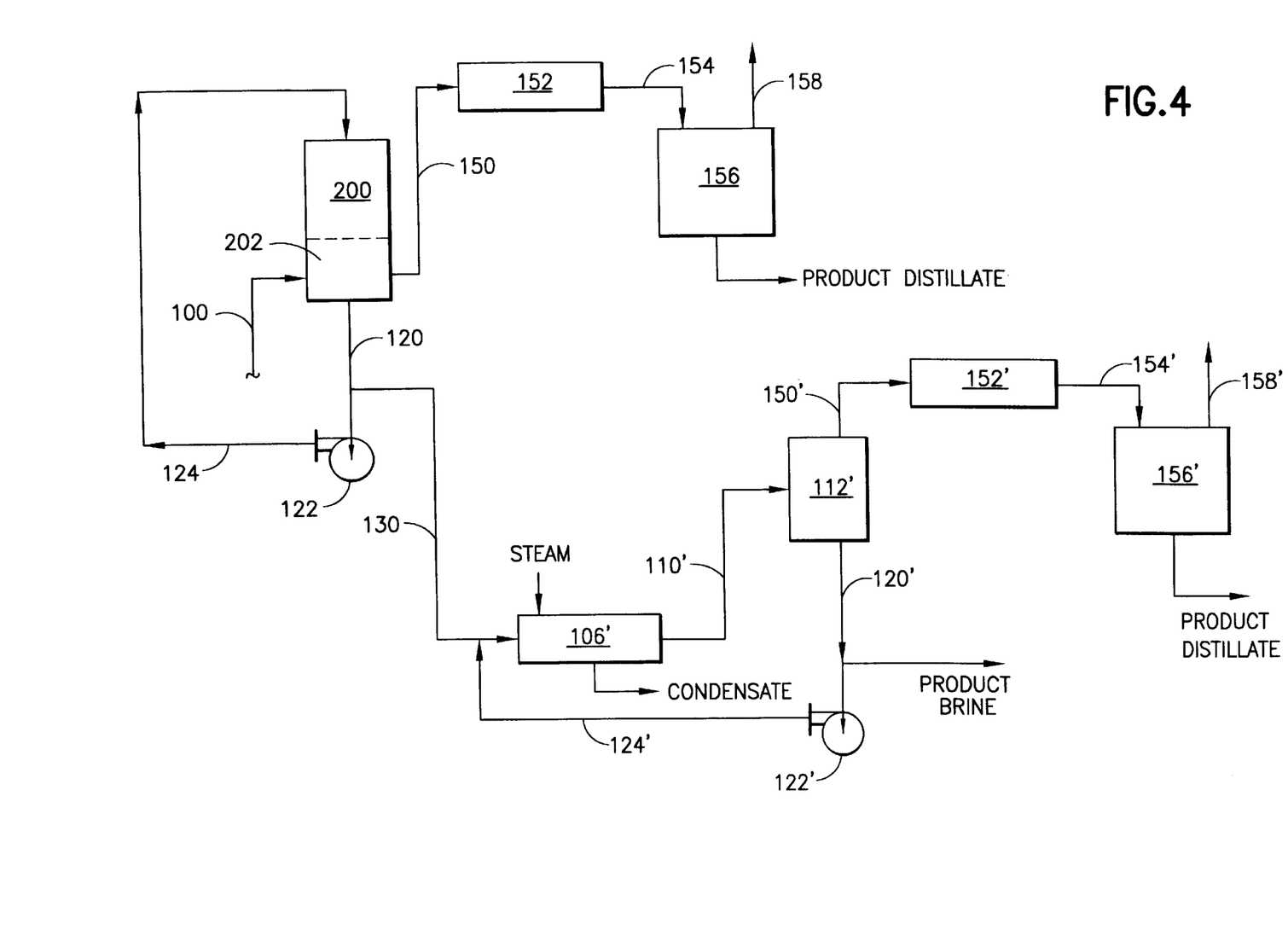
FIG. 4 is a simplified schematic representation of another alternative system for treating aqueous effluent produced by the process of FIG. 1.

FIG. 4 illustrates a blowdown grey water system which employs both a falling film evaporator and a forced circulation evaporator, the former being used as a first stage concentrator and the latter being used as a second stage concentrator. The elements associated with falling film evaporator 200 in FIG. 4 having the same reference numerals as those associated with the falling film evaporator in FIG. 3 have the same functions. Elements associated with forced circulation evaporator 106' in FIG. 4 having the same functions as those associated with the forced circulation evaporator on FIG. 2 are given primed reference numerals.

EXAMPLE 1

Pittsburgh No. 8 coal is ground in a mill and the ground coal added to water to form a slurry containing approximately 60–63% by weight of coal. The coal slurry is fed to a gasifier at a rate of 31,000 kg coal/hr and partially oxidized within the gasifier using substantially pure oxygen to produce hot effluent synthesis gas (syngas) which is quenched with water to cool the syngas and separate molten slag. The syngas is fed to a venturi scrubber and a carbon scrubber which remove fine ash, soot and salts in the gasification process water. The syngas is fed from a carbon scrubber to a cooler. The nitrogen to chlorine weight ratio in the feedstock is 11.7 which is high enough so that ammonia will be present in molar excess to the anions present, for example chloride, formate, and/or carbonate, in the water and the pH will be greater than 7.0. The aqueous effluent or blowdown water enters a water recycling and salt recovery operation at a rate of 14,308 liters per hour, and is introduced into a falling film evaporator which produces a distillate water stream which exits at the rate of 12,879 kilograms/hour and a first concentrated ammonium chloride-containing brine solution which enters a forced ciruclation evaporator at the rate of 1,431 kilograms/hour. A distillate water stream is produced which exits the forced circulation evaporator at the rate of 1,288 kilograms/hour, and a second concentrated ammonium chloride-containing brine solution which enters a drum dryer at the rate of 143 kilograms/hour. The drum dryer produces solids at a rate of 83 kilograms/hour and a distillate water stream at the rate of 60 kilograms/hour. The distillate water streams exiting the falling film evaporator, the forced circulation evaporator and the drum dryer are combined with 3,983 kilograms/hour of makeup water which is recycled to the coal slurry feedstock entering the gasifier.

The resulting partitioning of the coal constituents to the process blowdown water is shown in the analysis of the blowdown water given in Table 1. The process concentrations and flows for each operating unit are given in Table 2.

TABLE 1

PARTITIONING OF GASIFICATION COAL ASH MINERALS TO WATER

| | Gasifer Feed Coal (flow = 31,000 kg/hr) | | Blowdown Water (pH = 8.75 flow = 14,308 liters/hr) | | |
|---|---|---|---|---|---|
| Ash Species | Concentration | Mass Flow (grams/hr) | Concentration | Mass Flow (grams/hr) | % of Coal Material in Water |
| Ammonia as N | 1.4 wt % | 434,000 | 1,500 mg/L | 21,482 | 4.95 |
| Sodium | 590 mg/kg | 18,280 | 32 mg/L | 458 | 2.50 |
| Potassium | 1,200 mg/kg | 37,200 | 12 mg/L | 172 | 0.46 |
| Aluminum | 10,000 mg/kg | 310,000 | 2.3 mg/L | 33 | 0.01 |
| Calcium | 2,600 mg/kg | 80,600 | 20 mg/L | 288 | 0.36 |
| Magnesium | 700 mg/kg | 21,700 | 4.3 mg/L | 62 | 0.28 |
| Boron | 54 mg/kg | 1,674 | 37 mg/L | 529 | 31.62 |
| Chloride | 0.12 wt % | 37,200 | 2,800 mg/L | 37,200 | 100.00 |
| Fluoride | 0.019 wt % | 5,890 | 63 mg/L | 901 | 15.30 |
| Formate | — | 0 | 770 mg/L | 11,017 | — |
| Silicon | 19,000 mg/kg | 589,000 | 60 mg/L | 858 | 0.15 |
| Other Analyses | | | | | |
| Ash | 11.0 wt % | | | | |
| Carbon | 78 wt % | | | | |
| Hydrogen | 5.3 wt % | | | | |
| Sulfur | 2.7 wt % | | | | |

TABLE 2

| | Pitt 8 Dry Coal Feed to Gasifier | Total Flow to Gasitier | Feed to Falling Film Evaporator | Feed to Forced Circulation Evaporator | Drum Dryer Feed | Drum Dryer Solids (Wet Basis) | Drum Dryer Solids (Dry Basis) | Falling Film Evaporator Distillate | Forced Circulation Evaporator Distillate | Drum Dryer Distillate | Makeup Water |
|---|---|---|---|---|---|---|---|---|---|---|---|
| Stream No. 1 | | | | | | | | | | | |
| Total Flow (kg/hr) | 31000 | 49210 | 14310 | 1431 | 143 | 83 | 66.4 | 12879 | 1288 | 60 | 3983 |
| Chlorine Flow (kg/hr) | 37.2 | 37.2 | 37.2 | 37.2 | 37.2 | 37.2 | 37.2 | 0 | 0 | 0 | |
| Water Flow (kg/hr) | 0 | 18210 | | | | 16.6 | 0 | | | | |
| temp (° F.) | | | 170 | 215 | 235 | | | | | | |
| Soluble Components (mg/kg) | | | | | | | | | | | |
| Chloride | 1200 | | 2600 | 26000 | 260000 | 447720 | 559650 | <5 | <5 | <100 | |
| Formate | 0 | | 770 | 7390 | 24700 | 36800 | 45750 | 34 | 5470 | 14800 | |
| Ammonia as N | 0 | | 1462 | 12500 | 116200 | 197020 | 246275 | 431 | 2160 | 4600 | |
| Ammonia as NH4 | | | | | | 253311 | 316639 | | | | |
| Fiuoride | 190 | | 63 | 364 | 2365 | 4070 | 5088 | | | | |

TABLE 2-continued

|  | Pitt 8 Dry Coal Feed to Gasifier | Total Flow to Gasitier | Feed to Falling Film Evaporator | Feed to Forced Circulation Evaporator | Drum Dryer Feed | Drum Dryer Solids (Wet Basis) | Drum Dryer Solids (Dry Basis) | Falling Film Evaporator Distillate | Forced Circulation Evaporator Distillate | Drum Dryer Distillate | Makeup Water |
|---|---|---|---|---|---|---|---|---|---|---|---|
| Aluminum | 10000 |  | 0.2 | 1.2 | 0 |  |  |  |  |  |  |
| Boron | 54 |  | 35 | 376 | 3325 | 5726 | 7157 |  |  |  |  |
| Calcium | 2600 |  | 25 | 24 | 15 | 26 | 32 |  |  |  |  |
| Iron |  |  |  |  |  | 0 |  |  |  |  |  |
| Magnesium | 700 |  | 1.7 | 3.6 | 4 | 7 | 9 |  |  |  |  |
| Potassium | 1200 |  | 3.4 | 29 | 339 | 584 | 730 |  |  |  |  |
| Silicon | 19000 |  | 51 | 175 | 156 | 269 | 336 |  |  |  |  |
| Sodium | 590 |  | 32 | 320 | 3200 | 5510 | 6888 |  |  |  |  |
|  |  |  |  |  |  | 753823 |  |  |  |  |  |
| Ammonium Chloride |  |  |  |  |  | 674733 | 843416 |  |  |  |  |
| Water |  |  |  |  |  | 200000 |  |  |  |  |  |
| pH |  |  | 8.2 | 5.5 | 4.2 |  |  | 8.9 | 8.8 | 9.3 |  |

The falling film evaporator operates at a steam to brine temperature difference of 10° F. and a concentration factor of 10. The forced circulation evaporator operates at a steam to brine temperature difference of 24° F., a concentration factor of 10 and a brine velocity in the tubes of 10 ft/sec, and a concentrated ammonium chloride solution (40% by weight $NH_4Cl$) is produced. An analysis of the ammonium chloride brine solution from the falling film evaporator and the concentrated ammonium chloride brine solution from the forced circulation evaporator is given in Table 3 below.

TABLE 3

EVAPORATOR STREAM CHEMICAL BALANCES
(all values are mg/kg except pH; all metals are filtered (soluble))

| | Falling Film Evaporator | | | | Forced Circulation Evaporator | | | |
|---|---|---|---|---|---|---|---|---|
| Constituent | Feed | Distillate | Brine | *Conc. Factor | Feed | Distillat | Brine | *Conc. Factor |
| pH | 8.2 | 8.9 | 5.5 |  | 5.2 | 8.8 | 4.2 |  |
| Ammonia | 1,462 | 431 | 8,594 | 5.9 | 9,437 | 640 | 78,640 | 8.3 |
| Chloride | 3,017 | <5 | 27,592 | 9.1 | 24,267 | <5 | 283,000 | 11.7 |
| Formate | 145 | 14 | 1,958 |  | 3,130 | 1,380 | 15,025 | 4.8 |
| Fluoride | 63 |  | 364 | 5.8 | 336 |  | 2,365 | 7.0 |
| Aluminum | 0.2 |  | 1.2 | 6. |  |  |  |  |
| Boron | 35 |  | 376 | 10.7 | 426 | 11 | 3,325 | 7.8 |
| Calcium | 25 |  | 24 | 1.0 | 25 |  | 15 | 0.6 |
| Magnesium | 1.7 |  | 3.6 | 2.1 | 3 |  | 4 | 1.3 |
| Potassium | 3.4 |  | 29.4 | 8.6 | 35 |  | 339 | 9.7 |
| Silicon | 51 |  | 175 | 3.4 | 109 |  | 156 | 1.4 |
| Sodium | 268 |  | 2,774 | 10.4 | 2,895 | 1.8 | 23,175 | 8.0 |

*Concentration Factor = (concentration component brine/concentration component feed)

The concentrated ammonium chloride solution that is charged to the drum dryer contains 13.9% ammonium formate. The drum dryer is operated to produce 0.5 lb of distillate and 0.5 lb of ammonium chloride crystals per pound of brine. The composition of the drum dryer product is 73.1% ammonium chloride, 2.9% ammonium formate, 3.5% sodium chloride and 20.5% water.

Scale deposition rates on heat transfer tubes is extremely important. Scaling rates must be low enough to allow reasonable periods between cleaning intervals. The following operating conditions were found to prolong the cleaning intervals:

Operating conditions of the first stage falling film evaporator:

| Condition | Range | Preferred |
|---|---|---|
| Concentration factor | 2–100 | 10 |
| Steam to brine temp. difference | 1°–20° F. | 10° F. |
| Evaporation per pass | 0.1–2.4% | 1.2% |
| Sump residence time | 0.4–4 min. | 1.5 min. |

Operating conditions of the second-stage forced circulation evaporator:

-continued

| Condition | Range | Preferred |
|---|---|---|
| Concentration factor | 2–100 | 10 |
| Steam to brine temp. difference | 1–36° F. | 24° F. |
| Brine temp. rise in tubes | 1–18° F. | 18° F. |
| Brine velocity in tubes | 9–14 ft/sec | 10 ft/sec |
| Sump residence time | 0.25–3.5 min. | 1.5 min. |

A scaling rate of $1.25 \times 10^{-5}$ $ft^3$ scale/$ft^3$ water evaporated was found for the falling film evaporator operating under the preferred conditions and this scaling rate corresponds to cleaning tubes at 2 month intervals. A much lower scaling rate was found for the forced circulation evaporation 5.0× $10^{-7}$ ft$^3$ scale/ft$^3$ water evaporated and this scaling rate corresponds to cleaning tubes at 12 month intervals. In comparing the scaling rates, the numbers show that the falling film evaporator scales at a rate 25 times the forced circulation evaporator scaling rate. Thus substantial savings in maintenance and reduced down time are realized.

The composition of the scale in the evaporators on both the heated and unheated parts of the evaporation are given in Table 4 for the falling film and forced circulation evaporators.

TABLE 4

COMPARISON BETWEEN TUBE SCALE AND SUMP SCALE FOR GREY WATER EVAPORATION*

| | Mg (wt %) | Si (wt %) | P (wt %) | S (wt %) | Ca (wt %) | Fe (wt %) |
|---|---|---|---|---|---|---|
| Forced Circulation Evaporator Tube Scale | 91 | 2 | 2 | 0 | 3 | 2 |
| Forced Circulation Evaporator Sump Scale | 1 | 80 | 0 | 7 | 8 | 4 |
| Falling Film Evaporator Tube Scale | 3 | 55 | 0 | 2 | 40 | 0 |
| Falling Film Evaporator Sump Scale | 3 | 43 | 1 | 0 | 49 | 4 |

*elements with atomic numbers less than 11 are not quantified in analysis

The low scaling rates for the forced circulation evaporator are due to the main scaling components (calcium and silicon) in forced circulation evaporator feed being absent from the heat transfer surfaces. The fact that Mg is the predominant scale on the forced circulation tubes is evidence of the success in minimizing scaling of calcium and silicon, since magnesium is only 3 ppm and Si and Ca are 109 ppm and 25 ppm, respectively.

EXAMPLE 2

The process of Example 1 is repeated with the exception that the concentrated ammonium chloride brine solution produced in the forced circulation evaporator is introduced into a cooling crystallizer at the rate of 443 kilograms/hour to produce a slurry of ammonium chloride crystals at a rate of 414 kilograms/hour and a distillate water stream at a rate of 30 kilograms/hour. The slurry of ammonium chloride crystals enters a solids separation device which separates ammonium chloride crystals containing 7% $H_2O$ at the rate of 56 kilograms/hour, which is equivalent to 52 kilograms/hour on a dry basis. The solids separation device also produces a filtrate at the rate of 358 kilograms/hour, of which 339 kilograms/hour are recycled to the forced circulation evaporator, and a filtrate purge stream of 19 kilograms/hour is introduced into a drum dryer to produce solids at the rate of 8.8 kilograms/hour and a distillate water stream at the rate of 7 kilograms per hour. The distillate water stream exiting the falling film evaporator at the rate of 12,879 kilograms/hour and the distillate water stream exiting the forced circulation evaporator at the rate of 1,327 kilogram/hour are combined with the distillate water streams exiting the cooling crystallizer and the drum dryer and 3,963 kilograms/hour of makeup water which are all recycled to the coal slurry feedstock entering the gasifier. The process concentrations and flows are summarized in Table 5.

In this process two solid streams are produced: 51.9 kilogram/hour of 95.8% NH4 Cl from the centrifuge, 9.5 k/hr of 67.7% $NH_4Cl$ from the purge dryer. If these two streams are mixed, they result in 61.3 kilogram/hour of a 91.4% $NH_4Cl$ product.

TABLE 5

| Stream | Pitt 8 Dry Coat Feed to Gauifier | Total Flow to Gasifier | Feed to Falling Film Evaporator | Feed to Forced Circutation Evaporator | Feed to Cooling Crystalizer | Centrifuged Solids (Wet Basis) | Centrifuged Solids (Dry Basis) |
|---|---|---|---|---|---|---|---|
| Total Flow (kg/hr) | 31000 | 49210 | 14310 | 1431 | 443 | 58 | 51.8 |
| Chlorine Flow (kg/hr) | 37.2 | 37.2 | 37.2 | 37.2 | 115 | | 32.9 |
| Water Flow (kg/hr) | 0 | 18210 | | | | | |
| Temp (° F.) | | | 170 | 215 | 235 | | |
| Soluble Components (mg/kg) | | | | | | | |
| Chloride | 1200 | | 2600 | 26000 | 260000 | 588000 | 635676 |
| Formate | 0 | | 770 | 7390 | 24700 | 3760 | 4065 |
| Ammonia as N | 0 | | 1462 | 12500 | 110220 | 231887 | 250689 |
| Ammonia as NH4 | | | 298141 | 322314 | | | |
| Fluoride | 190 | | 63 | 364 | 21500 | 5590 | 6043 |
| Aluminum | 10000 | | 0.2 | 1.2 | 0 | | |
| Boron | 54 | | 35 | 376 | 18800 | 3680 | 3957 |
| Calcium | 2600 | | 25 | 24 | 25 | 87 | 94 |
| Iron | | | | | | | 0 |
| Magnesium | 700 | | 1.7 | 3.6 | 2 | 10 | 11 |
| Potassium | 1200 | | 3.4 | 29 | 10300 | 7130 | 7708 |
| Silicon | 19000 | | 51 | 175 | 126 | 116 | 125 |
| Sodium | 590 | | 32 | 320 | 31400 | 7030 | 7600 |
| Ammonium Chloride | | | | | | 913524 886141 | 957990 |
| Water | | | | | | 75000 | 0 |
| pH | | | 8.2 | 5.5 | 4.2 | | |

TABLE 5-continued

| | Filtrate from Centrifuge | Filtrate Purge to Drum Dryer | Purge Drum Dryer Solids (Wet Basis) | Purge Drum Dryer Solids (Dry Basis) | Falling Film Evaporator Distillate | Forced Circulation Evaporator Distillate | Cooling Crystalizer Distillate | Purge Drum Dryer Distillate |
|---|---|---|---|---|---|---|---|---|
| Stream | | | | | | | | |
| Total Flow (kg/hr) | 358 | 18.7 | 11.9 | 9.5 | 12879 | 1327 | 30 | 6.8 |
| Chlorine Flow (kg/hr) | 82.1 | 4.9 | 0 | | | | | |
| Water Flow (kg/hr) | | | | | | | | |
| Temp (° F.) | 135 | | | | | | | |
| Soluble Components (mg/kg) | | | | | | | | |
| Chloride | 229000 | 229000 | 359530 | 449413 | <5 | <5 | <5 | <100 |
| Formate | 34500 | 34500 | 46600 | 58250 | 34 | 5070 | 5070 | 13280 |
| Ammonia as N | 101040 | 101040 | 158833 | 198291 | 431 | 1578 | 1578 | 4132 |
| Ammonia as NH4 | | 129909 | 203956 | 254946 | | | | |
| Fluoride | 30400 | 30400 | 47728 | 59880 | | | | |
| Aluminum | | | | | | | | |
| Boron | 26400 | 26400 | 41448 | 51810 | | | | |
| Calcium | 12 | 12 | 19 | 24 | | | | |
| Iron | | | | | | | | |
| Magnesium | 2 | 2 | 3 | 4 | | | | |
| Potassium | 13600 | 13600 | 21352 | 28880 | | | | |
| Silicon | 144 | 144 | 226 | 283 | | | | |
| Sodium | 42600 | 42600 | 66882 | 83603 | | | | |
| | | 506567 | 787746 | 984581 | | | | |
| Ammonium Chloride | | | 541827 | 677284 | | | | |
| Water | | 493000 | 200000 | | | | | |
| pH | 4.2 | 4.2 | | | 8.9 | 8.8 | 9.3 | |

EXAMPLE 3

The process of Example 2 is repeated with the exception that the drum dryer is eliminated and the filtrate purge stream is combined with the distillate water stream that is recycled to the coal slurry feedstock entering the gasifier. The process concentrations and flow rates of each stream are summarized in Table 6.

TABLE 6

| | Pitt 8 Dry Coal Feed to Gasifier | Total Flow to Gasifier | Feed to Falling Film Evaporator | Feed to Forced Circulation Evaporator | Feed to Cooling Crystalizer | Centrifuged Solids (Wet Basis) | Centrifuged Solids (Dry Basis) | Filtrate from Centrifuge | Filtrate Purge to Gasifier | Falling Film Evaporator Distillate | Forced Circulation Evaporator Distillate | Cooling Crystalizer Distillate | Crystal Slurry |
|---|---|---|---|---|---|---|---|---|---|---|---|---|---|
| Stream | | | | | | | | | | | | | |
| Total Flow (kg/hr) | 31000 | 49210 | 15884 | 1588 | 492 | 63 | 58.5 | 399 | 16 | 14296 | 1479 | 32 | 460 |
| Chlorine Flow (kg/hr) | 37.2 | 40.9 | 40.9 | 40.9 | 128 | 37.2 | 37.2 | 91.4 | 3.7 | 0 | 0 | | |
| Water Flow (kg/hr) | 0 | 18210 | | | | | | | | | | | |
| Temp (° F.) | | | 170 | 215 | 235 | | | 135 | | | | | |
| Soluble Components (mg/kg) | | | | | | | | | | | | | |
| Chloride | 1200 | 2600 | 26000 | 260000 | 588000 | 635676 | | 229000 | 229000 | <5 | <5 | 5070 | |
| Formate | 0 | 770 | 7390 | 24700 | 3760 | 4065 | 34500 | 34500 | 34 | 5070 | 5070 | | |
| Ammonia as N | 0 | 1462 | 12500 | 110220 | 231887 | 250689 | 101040 | 101040 | 431 | 1578 | 1578 | | |
| Ammonia as NH4 | | | | | 298141 | 322314 | | 129909 | | | | | |
| Fluoride | 190 | 63 | 364 | 21500 | 5590 | 6043 | | 30400 | 30400 | | | | |
| Aluminum | 10000 | 0.2 | 1.2 | | | 0 | | | | | | | |
| Boron | 54 | 35 | 376 | 18800 | 3680 | 3957 | | 26400 | 26400 | | | | |

TABLE 6-continued

| | Pitt 8 Dry Coal Feed to Gasifier | Total Flow to Gasifier | Feed to Falling Film Evaporator | Feed to Forced Circulation Evaporator | Feed to Cooling Crystallizer | Centrifuged Solids (Wet Basis) | Centrifuged Solids (Dry Basis) | Filtrate from Centrifuge | Filtrate Purge to Gasifier | Falling Film Evaporator Distillate | Forced Circulation Evaporator Distillate | Cooling Crystallizer Distillate | Crystal Sturry |
|---|---|---|---|---|---|---|---|---|---|---|---|---|---|
| Calcium | 2600 | 25 | 24 | 25 | 87 | 94 | 12 | 12 | | | | | |
| Iron | 0 | | | | | | | | | | | | |
| Magnesium | 700 | 1.7 | 3.6 | 2 | tO | 11 | 2 | 2 | | | | | |
| Potassium | 1200 | 3.4 | 29 | 10300 | 7130 | 7708 | 13600 | 13600 | | | | | |
| Silicon | 19000 | 51 | 175 | 126 | 116 | 125 | 144 | 144 | | | | | |
| Sodium | 590 | 32 | 320 | 31400 | 7030 | 7600 | 42600 | 42600 | | | | | |
| Sum of Analyzed Components | | | | | 913524 | | | 506567 | | | | | |
| Ammonium Chloride | | | | | 886141 | 957990 | | | | | | | |
| Water | | | | | 75000 | 0 | | 493000 | | | | | |
| pH | | 8.2 | 5.5 | 4.2 | | | 4.2 | 4.2 | | 8.9 | 8.8 | 9.3 | |

In each of Examples 1, 2, 3 about 56 grams/hr of NH$_4$Cl was recovered with the following purities.

| | Recovered Product | | Purity | |
|---|---|---|---|---|
| Example 1 | 66.4 kg/hr | (total solids) | 84.3% NH$_4$Cl | (drum dryer) |
| Example 2 | 51.8 kg/hr | (centrifuge solids) | 95.8% NH$_4$Cl | |
| | 9.5 kg/hr | (purge dryer solids) | 67.7% NH$_4$Cl | |
| | 61.3 kg/hr | (total solids) | 91.4% NH$_4$Cl | (crystallizer with purge dryer) |
| Example 3 | 58.5 kg/hr | (total solids) | 95.8% NH$_4$Cl | (crystallizer with purge stream to gasifier) |

The above values illustrate the advantage of using a crystallizer with a purge stream recycled to the gasifier. A high purity stream was recovered.

It should also be noted that under the prescribed conditions much of the formate is recycled to the distillate rather than contaminating the brine. Therefore, a purer product is obtained.

EXAMPLE 4

The process of Example 2 is repeated with the exception that the falling film evaporator is eliminated and the blowdown water is introduced directly into the forced circulation evaporator.

A liquid feedstock with a composition shown in Table 7 is fed to a gasifier at a feed rate of 31,000 kilogram/hour. The resulting syngas is fed to a water scrubber where chlorine and solids are removed from the syngas. The nitrogen content of the feedstock is 0.11% and the chlorine is 0.22%. The ratio of nitrogen to chlorine in the feed is too low to recover the chlorine as ammonium chloride as was done in Examples 1, 2, and 3. In this case, approximately 22.4 kilogram/hour of ammonia are added to the scrubber as a 29% aqueous ammonia solution at a rate of 77.3 kilogram/hour which maintains the pH of the scrubber water at 7.0 or higher, and is based upon an estimated conversion of nitrogen in the feed to ammonia in the syngas of 25%. Thus, 32.8 kilogram/hour of ammonia are needed to neutralize the 0.22% chlorine in the feed, while 10.4 kilogram/hour of ammonia are produced in the gasifier. The ammonia values calculated here provide an estimate for sizing equipment, with variable feed concentrations and with the pH control the objective. Maintaining the pH of the scrubber water above 7.0 has the desired advantage of recovering ammonium chloride from the blowdown water when fed to an evaporator and crystallizing means designed and operated in such a way that deposition of scaling minerals on heat transfer surfaces is minimized.

TABLE 7

GASIFIER FEED AND BLOWDOWN WATER CONCENTRATIONS

| Component | Gasifier Feed | Blowdown Water |
|---|---|---|
| Carbon | 84.8% | |
| Hydrogen | 13.4% | |
| Nitrogen | 0.11% | |
| Sulfur | 0.06% | |
| Ash | 1.57% | |
| Chlorine | 2200 mg/kg | 21760 mg/kg |
| Fluorine | | 7 mg/kg |
| Na | 754 mg/kg | 206 mg/kg |
| Mg | 220 mg/kg | 42 mg/kg |
| Al | 393 mg/kg | 0.2 mg/kg |
| Si | 848 mg/kg | 61 mg/kg |
| K | 126 mg/kg | 146 mg/kg |
| Ca | 754 mg/kg | 62 mg/kg |
| Ti | 3313 mg/kg | |
| Cr | 565 mg/kg | <0.1 mg/kg |
| Zn | 644 mg/kg | 0.6 mg/kg |
| Fe | | 21 mg/kg |
| formate (HCOO) | | 358 mg/kg |
| total cyanide | | 29 mg/kg |
| free cyanide | | 5 mg/kg |
| pH | | 8.5 |
| Ammonia as N | | 9410 mg/kg |
| flow | 31000 kg/hr | 3134 kg/hr |

The blowdown water stream from the scrubber is sent to the forced circulation evaporator at a rate of 3138 kilogram/hour which corresponds to a chloride concentration in the scrubber of 21760 mg/kg.

The composition of the brine and distillate water exiting the forced circulation evaporator appear in Table 8. The parameters set for the forced circulation evaporator are:

Tube velocity: 10 ft/sec

Steam to brine temperature difference: 25° F.

Brine temperature rise: 6° F.

A sump residence time of 1 minute results in very low scaling rates on the heat transfer surfaces of $5.2 \times 10^{-8}$ ft$^3$/scale/ft$^3$ water evaporated. In 29.5 days of operation, only 4.57 grams of scale deposit on the heat transfer tube. The scale that forms on the tubes is approximately 20% silica and 80% iron cyanide.

This data shows that the use of specified parameters in the forced circulation evaporator for gasification water results in superior scale minimization.

TABLE 8

| Item | Feed to Gasifier | Feed to Forced Circulation Evaporator | Feed to Cooling Crystallizer | Filtrate Solids Separation Device | Forced Circulation Evporator Distillate | Cooling Crystallizer Distillate |
|---|---|---|---|---|---|---|
| Temperature (° F.) | | 170 | 235 | 115 | | |
| Total Flow (kg/hr) | 31000 | 3134 | | | 1327 | |
| Chlorine Flow (kg/hr) | 68.2 | 68.2 | | | 0 | |
| Soluble Components (mg/kg) | | | | | | |
| Chloride | 2200 | 21760 | 265000 | | | 1 |
| Formate | | 358 | 2623 | | 408 | 1651 |
| Ammonia as N | | 9410 | 104300 | | 952 | 1058 |
| Fluoride | | | 27 | | 1 | |
| Aluminum | 393 | 0.2 | 0.4 | | | |
| Calcium | 754 | 62 | 25 | | | |
| Iron | | 21 | 87 | | | |
| Magnesium | 220 | 42 | 406 | | | |
| Silicon | 848 | 61 | 98 | | | |
| Sodium | 754 | 206 | 2204 | | | |
| Total Cyanide | | 29 | 5 | | 21 | 0.9 |
| Free Cyanide | | 5 | 2 | | 9 | 0.6 |
| pH | | 8.5 | 4.54 | | 9.52 | |

What is claimed is:

1. A process for minimizing evaporator scaling and for recovering water and salts from an aqueous effluent containing ammonium chloride that is formed during the partial oxidation gasification of a hydrocarbonaceous feedstock to produce a synthesis gas, comprising:

(a) scrubbing the synthesis gas with water at a pH of at least about 6.0, wherein said pH is maintained with ammonia;

(b) separating the synthesis gas from the scrubbing water;

(c) separating a portion of the scrubbing water to form an aqueous effluent which is introduced to an evaporation system;

(d) evaporating the aqueous effluent to produce water vapor and a brine having an ammonium chloride concentration of about 10 to about 60 weight percent;

(e) separating the water vapor from the brine;

(f) condensing the water vapor to form a distillate water;

(g) recycling the distillate water to the partial oxidation gasification;

(h) recovering the ammonium chloride from the brine; and (i) operating the evaporator at conditions that minimize evaporator scaling.

2. The process of claim 1 wherein the hydrocarbonaceous feedstock is selected from the group consisting of petroleum coke, coal, plastic wastes, sewage and mixtures thereof.

3. The process of claim 1 wherein the concentration factor during evaporation of the aqueous effluent is about 2 to 1000.

4. The process of claim 3, wherein the concentration factor varies from about 2 to about 20.

5. The process of claim 3, wherein the concentration factor varies from about 20 to about 150.

6. The process of claim 1 wherein the concentration of ammonium chloride in the aqueous effluent is at least about 0.1 weight % to about 15 weight %.

7. The process of claim 1 wherein the evaporator is selected from the group consisting of a falling film evaporator, a forced circulation evaporator, and a combination thereof.

8. The process of claim 7, wherein the ammonium chloride is recovered from the brine by crystallizing means.

9. The process of claim 8, wherein the crystallizing means is at least one selected from the group consisting of a spray dryer, a drum dryer, and a flash cooling crystallizer.

10. The process of claim 7, wherein the volume of brine discharged from the evaporator is controlled by on line volume measurement using level detectors.

11. The process of claim 10, wherein the level detector is a float level sensor.

12. The process of claim 10, wherein the level detector is an ultrasonic sensor.

13. The process of claim 1, wherein the evaporating system is a falling film evaporator discharging to a forced circulation evaporator.

14. The process of claim 13, wherein the falling film evaporator operates at the following conditions:

i) a concentration factor of about 2 to about 100;

ii) a steam to brine temperature difference of about 1° F. to about 20° F.;

iii) an evaporation per pass of about 0.1% to about 2.4%;

iv) a sump residence time of about 0.4 minutes to about 4 minutes.

15. The process of claim 14, wherein the steam to brine temperature difference varies from about 6° F. to about 10° F. and the evaporation per pass varies from about 0.6% to about 1.2%.

16. The process of claim 13, wherein the forced circulation evaporator operates at the following conditions:

i) a concentration factor of about 2 to about 100;

ii) a steam to brine temperature difference of about 1° F. to about 36° F.;

iii) a brine temperature rise in tubes of about 1° F. to about 18° F.;

iv) a brine velocity in tubes of about 9 feet/second to about 14 feet/second;

v) a sump residence time of about 0.25 minute to about 3.5 minutes.

17. The process of claim 16, wherein the steam to brine temperature difference varies from about 12° F. to about 24° F.; the brine temperature rise in the tubes varies from about 12° F. to about 18° F.; and the brine velocity in the tubes varies from about 10 feet/second to about 13 feet/second.

18. The process of claim 1, wherein the evaporating system is a forced circulation evaporator.

19. The process of claim 18, wherein the forced circulation evaporator operates at the following conditions:

i) a concentration factor of about 2 to about 100;

ii) a steam to brine temperature difference of about 1° F. to about 36° F.;

iii) a brine temperature rise in tubes of about 1° F. to about 18° F.;

iv) a brine velocity in tubes of about 9 feet/second to about 14 feet/second;

v) a sump residence time of about 0.25 minute to about 3.5 minutes.

20. The process of claim 1, wherein the evaporating system is a forced circulation evaporator discharging to a crystallizing means.

21. The process of claim 20, wherein the forced circulation evaporator operates at the following conditions:

i) a concentration factor of about 2 to about 100;

ii) a steam to brine temperature difference of about 12° F. to about 25° F.;

iii) a brine temperature rise in the tubes of about 6° F. to about 18° F.;

iv) a brine velocity in tubes of about 10 feet/second to about 13 feet/second;

v) a sump residence time of about 0.5 minutes to about 1.5 minutes.

22. The process of claim 1, wherein a portion of the brine from step (a) is recycled to the partial oxidation gasification reaction.

* * * * *

UNITED STATES PATENT AND TRADEMARK OFFICE
CERTIFICATE OF CORRECTION

PATENT NO.   : 6,086,722
DATED        : July 11, 2000
INVENTOR(S)  : George H. Webster Jr. et al.

It is certified that error appears in the above-identified patent and that said Letters Patent is hereby corrected as shown below:

Columns 13 and 14, Table 2,
For entry entitled *Aluminum* delete "0" below column entitled *Drum Dryer Feed;*
insert -- 0 -- below column entitled *Drum Dryer Solids (Dry Basis)*.

Columns 15 and 16, Table 5,
For entry entitled *Ammonia as NH4* delete "298141" below column entitled *Feed to Falling Film Evaporator;*
delete "322314" below column entitled *Feed to Forced Circulation Evaporator;*
insert -- 298141 -- below column entitled *Centrifuged Solids (Wet Basis);*
insert -- 322314 -- below column entitled *Centrifuged Solids (Dry Basis)*.

Columns 15 and 16, Table 5,
For entry entitled *Aluminum* delete "0" below column entitled *Feed to Cooling Crystalizer;*
insert -- 0 -- below column entitled *Centrifuged Solids (Dry Basis)*.

Columns 17 and 18, Table 5,
For entry entitled *Chlorine Flow (kg/hr)*,
delete "0" below column entitled *Purge Drum Dryer Solids (Wet Basis);*
insert -- 0 -- below column entitled *Falling Film Evaporator Distillate;*
insert -- 0 -- below column entitled *Forced Circulation Evaporator Distillate*.

UNITED STATES PATENT AND TRADEMARK OFFICE
CERTIFICATE OF CORRECTION

PATENT NO.   : 6,086,722
DATED        : July 11, 2000
INVENTOR(S)  : George H. Webster Jr. et al.

It is certified that error appears in the above-identified patent and that said Letters Patent is hereby corrected as shown below:

Columns 17, 18, 19, and 20, Table 6,
Replace Table 6 with the following:

Table 6

| Stream | Pitt 8 Dry Coal Feed to Gasifier | Total Flow to Gasifier | Feed to Falling Film Evaporator | Feed to Forced Circulation Evaporator | Feed to Cooling Crystallizer | Centrifuged Solids (Wet Basis) | Centrifuged Solids (Dry Basis) | Filtrate from Centrifuge | Filtrate Purge to Gasifier | Falling Film Evaporator Distillate | Forced Circulation Evaporator Distillate | Cooling Crystallizer Distillate | Crystal Slurry |
|---|---|---|---|---|---|---|---|---|---|---|---|---|---|
| Total Flow (kg/hr) | 31000 | 49210 | 15884 | 1588 | 492 | 63 | 58.5 | 399 | 16 | 14296 | 1479 | 32 | 460 |
| Chlorine Flow (kg/hr) | 37.2 | 40.9 | 40.9 | 40.9 | 128 | 37.2 | 37.2 | 91.4 | 3.7 | 0 | 0 | | |
| Water Flow (kg/hr) | 0 | 18210 | | | | | | | | | | | |
| Temp (°F) | | | 170 | 215 | 235 | | | 135 | | | | | |
| Soluble Components (mg/kg) | | | | | | | | | | | | | |
| Chloride | 1200 | | 2600 | 26000 | 260000 | 588000 | 635676 | 229000 | 229000 | <5 | <5 | <5 | |
| Formate | 0 | | 770 | 7390 | 24700 | 3760 | 4065 | 34500 | 34500 | 34 | 5070 | 5070 | |
| Ammonia as N | 0 | | 1462 | 12500 | 110220 | 231887 | 250689 | 101040 | 101040 | 431 | 1578 | 1578 | |
| Ammonia as NH4 | | | | | | 298141 | 322314 | | 129909 | | | | |
| Fluoride | 190 | | 63 | 364 | 21500 | 5590 | 6043 | 30400 | 30400 | | | | |
| Aluminum | 10000 | | 0.2 | 1.2 | | | 0 | | | | | | |
| Boron | 54 | | 35 | 376 | 18800 | 3680 | 3957 | 26400 | 26400 | | | | |
| Calcium | 2600 | | 25 | 24 | 25 | 87 | 94 | 12 | 12 | | | | |
| Iron | | | | | | | 0 | | | | | | |
| Magnesium | 700 | | 1.7 | 3.6 | 2 | 10 | 11 | 2 | 2 | | | | |
| Potassium | 1200 | | 3.4 | 29 | 10300 | 7130 | 7708 | 13600 | 13600 | | | | |
| Silicon | 19000 | | 51 | 175 | 126 | 116 | 125 | 144 | 144 | | | | |
| Sodium | 590 | | 22 | 320 | 31400 | 7030 | 7600 | 42600 | 42600 | | | | |
| Sum of Analyzed Components | | | | | | 913524 | | | 506567 | | | | |
| Ammonium Chloride | | | | | | 886141 | 957990 | | | | | | |
| Water | | | | | | 75000 | 0 | | 493000 | | | | |
| pH | | | 8.2 | 5.5 | 4.2 | | | 4.2 | 4.2 | 8.9 | 8.8 | 9.3 | |

UNITED STATES PATENT AND TRADEMARK OFFICE
CERTIFICATE OF CORRECTION

PATENT NO. : 6,086,722
DATED : July 11, 2000
INVENTOR(S) : George H. Webster Jr. et al.

It is certified that error appears in the above-identified patent and that said Letters Patent is hereby corrected as shown below:

Columns 21 and 22, Table 8,
For entry entitled *Chloride* insert -- 1 -- below column entitled *Forced Circulation Evaporator Distillate*.

Signed and Sealed this

Fourth Day of December, 2001

Attest:

NICHOLAS P. GODICI
Attesting Officer  Acting Director of the United States Patent and Trademark Office